United States Patent [19]

Stoddard et al.

[11] 4,354,842
[45] Oct. 19, 1982

[54] SYSTEM FOR UTILIZING INTERACTIVE BLOCKS TO TEACH ARITHMETIC

[75] Inventors: Deborah Stoddard; Blair F. Baldwin, both of New York, N.Y.; Donald Gorgas, Long Valley, N.J.

[73] Assignee: Baldwin, Stoddard & Co., New York, N.Y.

[21] Appl. No.: 267,682

[22] Filed: May 28, 1981

[51] Int. Cl.³ .............................................. G09B 19/02
[52] U.S. Cl. .................................... 434/195; 434/208; 434/345
[58] Field of Search ............... 434/191, 195, 200, 204, 434/208, 343, 345, 205

[56] References Cited

U.S. PATENT DOCUMENTS

| | | | |
|---|---|---|---|
| 1,396,379 | 11/1921 | Moore | 434/345 |
| 2,317,206 | 4/1943 | Major | 434/195 |
| 2,835,988 | 5/1958 | Hilkene | 434/195 |
| 2,909,851 | 10/1959 | Haddock | 434/345 |
| 3,001,301 | 9/1961 | Carl | 434/205 |
| 3,504,449 | 4/1970 | Kobler et al. | 434/205 |
| 3,526,973 | 9/1970 | Delves | 434/195 |
| 3,571,950 | 3/1971 | Walker | 434/205 X |

Primary Examiner—William H. Grieb
Attorney, Agent, or Firm—Burgess, Ryan and Wayne

[57] ABSTRACT

A base member has a plurality of upwardly facing openings for receiving arithmetic value blocks such as addition or subtraction blocks, a first upwardly facing end opening for receiving positive answer blocks and a second upwardly facing opposite end opening for receiving negative answer blocks. A summing rack including transverse gear teeth is slidably mounted in a longitudinal slot in the base member communicating with each of the recesses. One end of the summing rack has an encoded pattern of holes defining the numerical values of possible positive answers; and the other end of the summing rack has a similar series of holes defining the numerical values of possible negative answers. Each of the recesses which receives an arithmetic value block has a sector gear therein which engages the summing rack teeth and moves the rack a proportionate distance when an addition or subtraction block is inserted into the corresponding recess. When one or more addition and/or subtraction blocks are inserted into corresponding recesses in the base member, the gear rack is moved by a distance corresponding to the algebraic sum of the arithmetic values associated with the inserted blocks, so that the hole pattern in the summing rack at the bottom of the corresponding answer block receiving recess is in such a position that only an answer block having an associated arithmetic value equal to said algebraic sum can be inserted therein.

15 Claims, 17 Drawing Figures

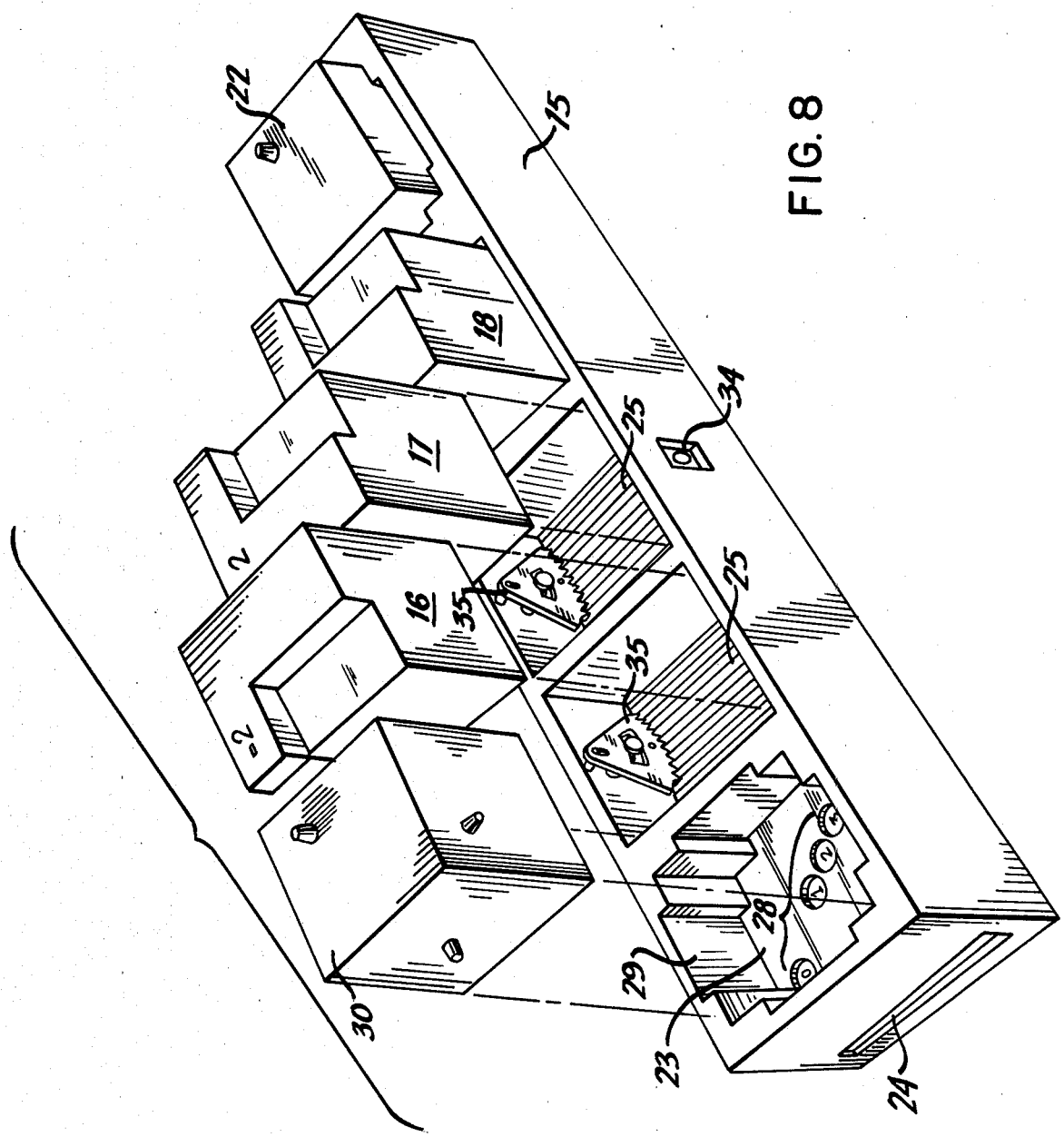

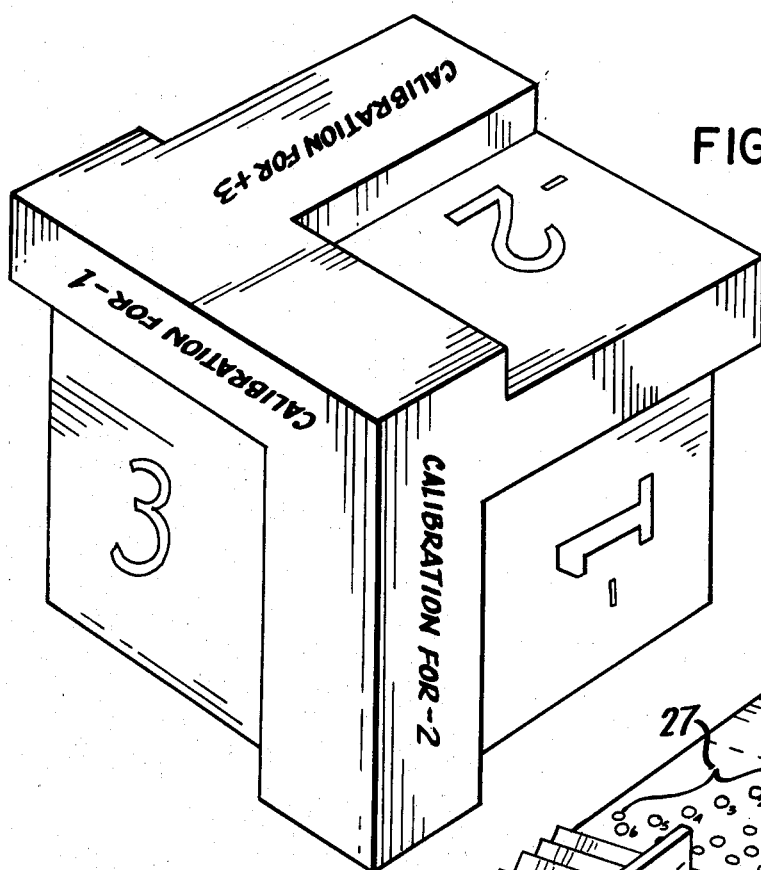
FIG. 9
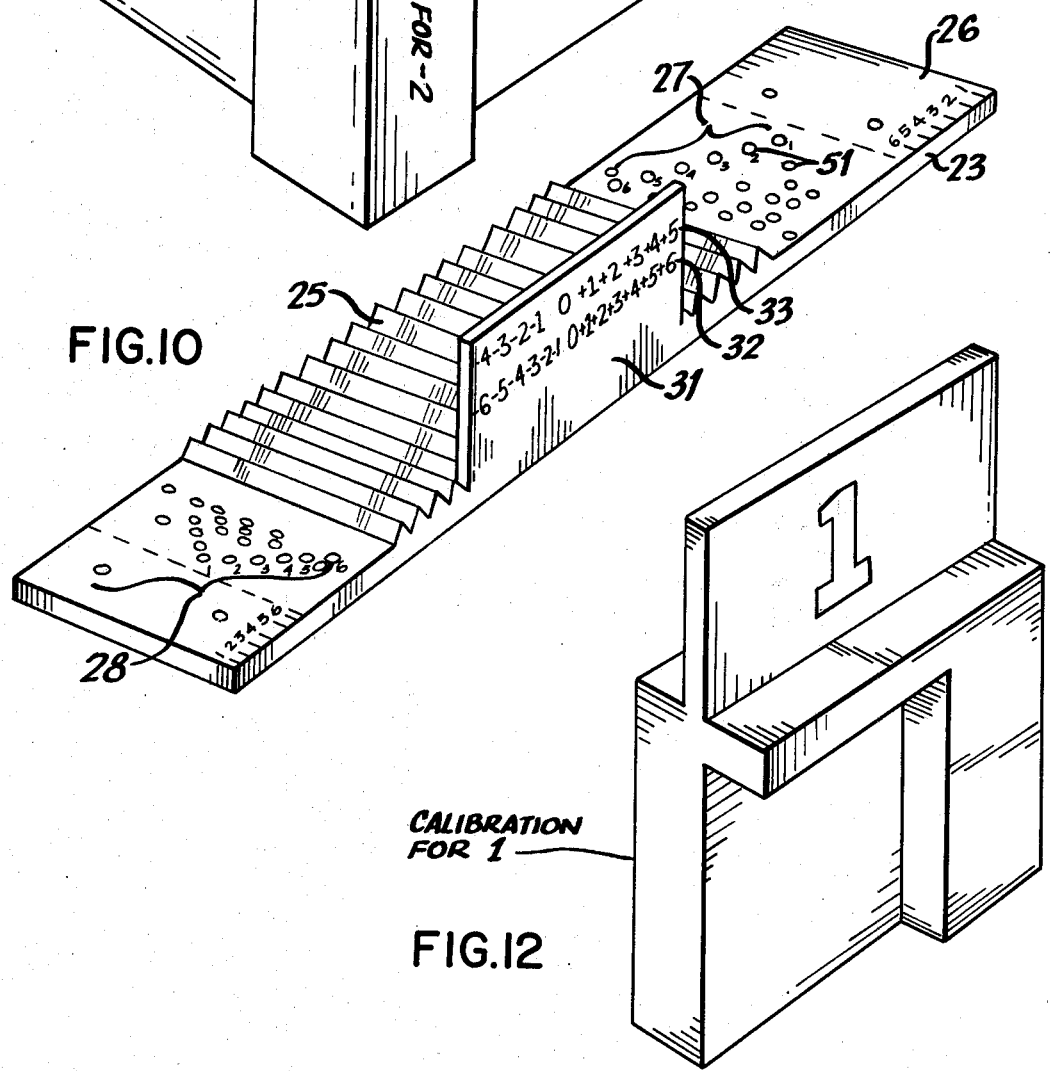
FIG. 10
FIG. 12

SYSTEM FOR UTILIZING INTERACTIVE BLOCKS TO TEACH ARITHMETIC

BACKGROUND OF THE INVENTION

This invention relates to educational apparatus, and more particularly to a system for utilizing interactive blocks to teach arithmetic.

An object of the present invention is to provide a system using interactive blocks corresponding to various arithmetic values, which blocks can be arrayed with a corresponding answer block only when the arithmetic statement made thereby is correct; and which is susceptible to mass production at relatively low cost.

SUMMARY

As herein described there is provided a system for utilizing interactive blocks to teach arithmetic comprising a base member having a longitudinal passage therein and a plurality of recesses communicating with said passage, each recess extending to a surface of said base member; a summing rack mounted for longitudinal movement in said passage; cam means disposed in selected ones of said recesses for causing incremental movement of said summing rack in response to insertion of an arithmetic value block into the corresponding recess, the amplitude of said movement being proportional to a given dimension of an actuating portion of said block associated with the arithmetic value thereof; indexing means operatively associated with said summing rack and having a series of index elements adjacent a predetermined one of said recesses, said index elements establishing a pattern in said recess uniquely corresponding to the longitudinal position of said summing rack in said passage, for enabling said predetermined recess to receive only an answer block having index element engaging means disposed in a pattern corresponding to an arithmetic value defining the longitudinal position of said summing rack; whereby when one or more arithmetic value blocks are inserted in the corresponding recesses, said predetermined recess is rendered capable of receiving only an answer block having an associated arithmetic value equal to the arithmetic combination of the values associated with said arithmetic value blocks.

IN THE DRAWING

FIG. 8 is an isometric view of the base member shown in FIG. 1, with arithmetic value blocks and answer blocks shown in various positions with respect thereto;

FIG. 9 is an isometric view of a multi-value addition block having actuating surfaces corresponding to three different arithmetic values;

FIG. 10 is an isometric view of the summing rack slidably mounted in a longitudinal slot of the base member as shown in FIG. 1;

FIG. 12 is an isometric view of an elongated rectangular arithmetic value block according to an alternative embodiment of the invention.

DETAILED DESCRIPTION

Figure 1:
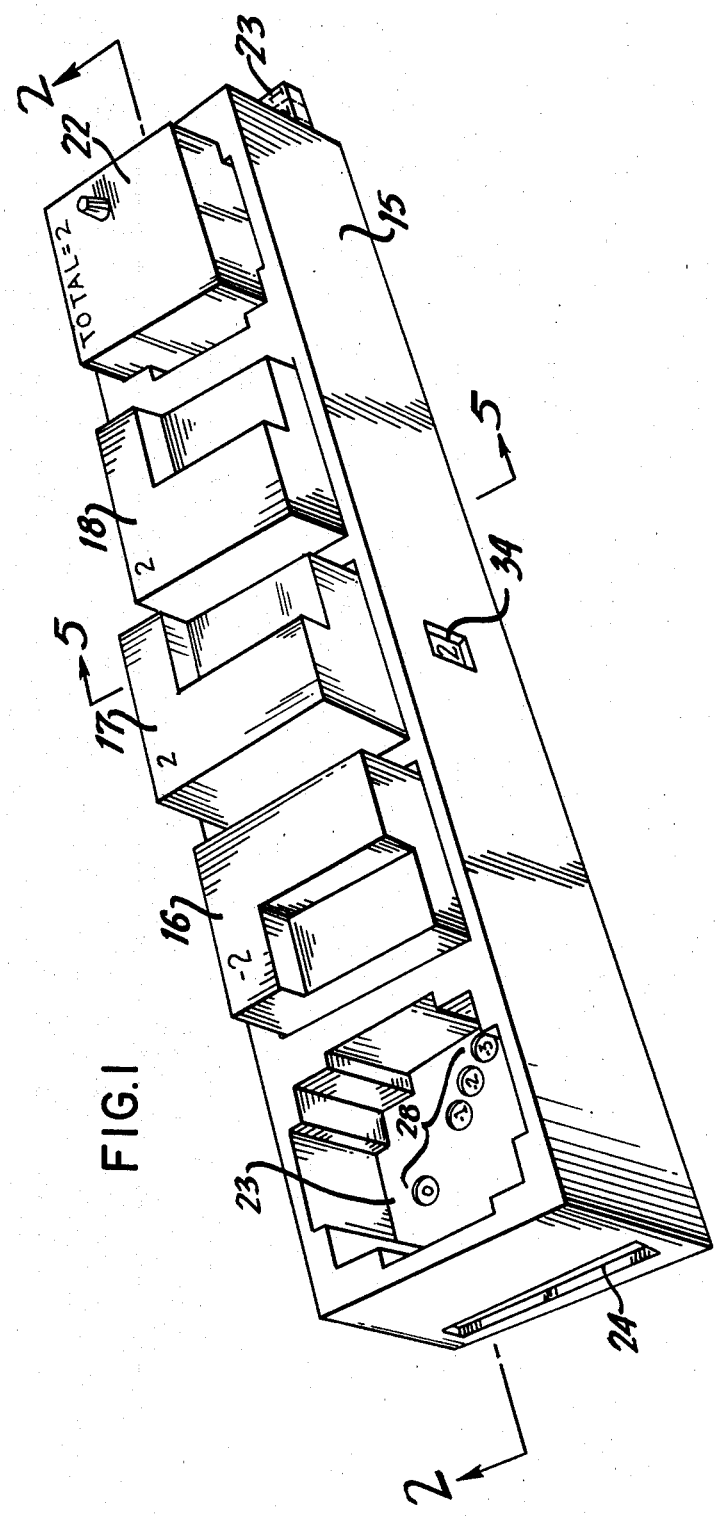
FIG. 1 is an isometric view of a base member of the system according to a preferred embodiment of the invention, with one subtraction block, two addition blocks and a positive answer block inserted therein.

As best seen in FIGS. 1 and 8, a base member 15 has five upwardly facing openings or recesses therein, of generally rectangular cross section. The three central recesses are adapted to receive arithmetic value blocks 16, 17 and 18, which have actuating portions 19, 20 and 21 respectively, dimensioned and positioned to correspond to any one of a number of positive or negative arithmetic values. In the particular arrangement depicted in FIGS. 1 and 8, the blocks 16, 17 and 18 have arithmetic values $-2$, $+2$ and $+2$ respectively.

As shown in FIG. 1, a positive answer block 22 is inserted in the answer block receiving recess at one end of the base member 15, the answer block 22 having a value of $+2$ correctly corresponding to the algebraic sum of the values associated with the blocks 16, 17 and 18.

A summing rack 23, best shown in FIG. 10, is slidably mounted in a longitudinal slot or passage 24 of the base member 15. The summing rack 23 has a multiplicity of transverse gear teeth 25 extending upwardly therefrom intermediate the ends thereof. The length of the summing rack is approximately the same as the length of the base member 15, and the surface of the summing rack bearing the transverse teeth 25 is in communication with each of the three central arithmetic block receiving recesses of the base member 15.

One end 26 of the summing rack 23 has a generally diagonally oriented pattern of index elements in the form of holes 27 defining the numerical values of possible positive answers, the holes 27 being generally adjacent the end recess of the base member 15 which receives positive value answer blocks such as the block 22. The other end of the summing rack 23 has a similarly arranged set of index elements in the form of holes 28 positioned adjacent the opposite end recess 29 for receiving negative answer blocks such as the block 30.

Extending vertically upward at the front of the summing rack 23 is a scale support 31 having a linear scale 32 and a logarithmic scale 33. The scales 32 and 33 cooperate with a window 34 in the front side of the base 15, so that only a single numerical value of one scale is visible at a time. The height of the window 34 is selected to correspond to the linear scale 32 when the base member 15 is used for the teaching of addition and subtraction; and is positioned to correspond to the logarithmic scale 33 when multiplication is to be taught.

For such multiplication operation the apparatus acts in similar fashion to a slide rule, with the linear movements of the summing rack 23 being translated to corresponding logarithmic movements by the scale 33, so that the reading in the window 34 corresponds to the product (and/or quotient) of the arithmetic values of the blocks inserted in the three central recesses of the base member 15. The following discussion, however, will for simplicity be directed to the embodiment of the invention wherein the apparatus shown in the drawings is used for the teaching of addition and subtraction.

Figure 11A:
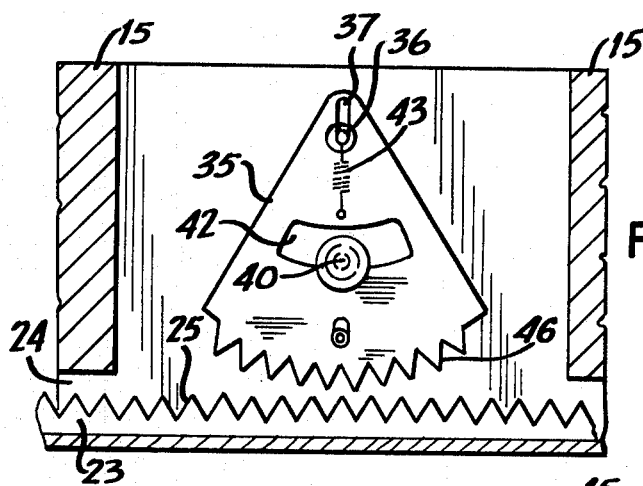
FIGS. 11a through 11d are cross sectional views illustrating various movements of a sector cam situate in one of the arithmetic value block recesses of the base member shown in FIG. 1, in response to insertion of an arithmetic value block therein.

In each of the three central arithmetic value block receiving recesses of the base member 15, a sector cam or gear 35 is rotatably mounted to the rear inside wall of the base member 15 by means of a pin 36 extending into an elongated slotted hole 37 of the sector cam 35. A spring loaded alignment pin 38 is mounted on the rear interior wall of the base member 15 and is resiliently urged into engagement with an elongated generally conical tapered alignment hole 39 adjacent the lower end of the sector cam 35. A guide pin 40 secured to the rear inside surface of the base member 15 and having an enlarged head 41, engages an arcuate guide slot 42 in the central region of the sector cam 35. A spring 43 coupled between the pin 36 and a post 44 extending from the rear surface of the sector cam 35, serves to urge the sector cam 35 upward, so that in the initial or "rest" position as best shown in FIG. 11a, the pin 36 engages the bottom of the slot 37. The spring 43 also acts to restore the sector cam 35 to its initial orientation, i.e., symmetrically disposed about a vertical plane through the pin 36.

Figure 2:
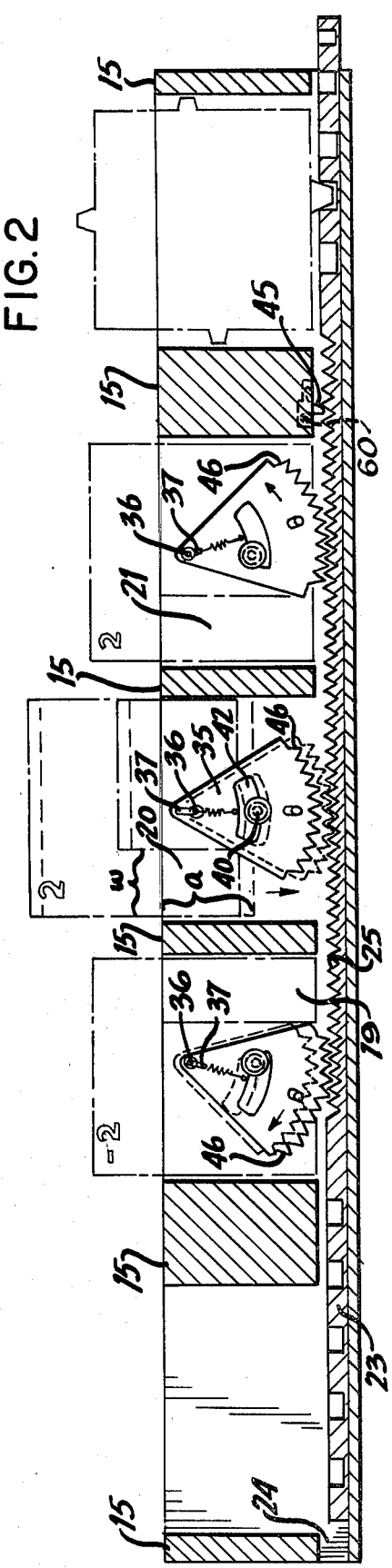
FIG. 2 is a front cross sectional view of the arrangement shown in FIG. 1, taken along the cutting plane 2—2 therein.
Figure 3:
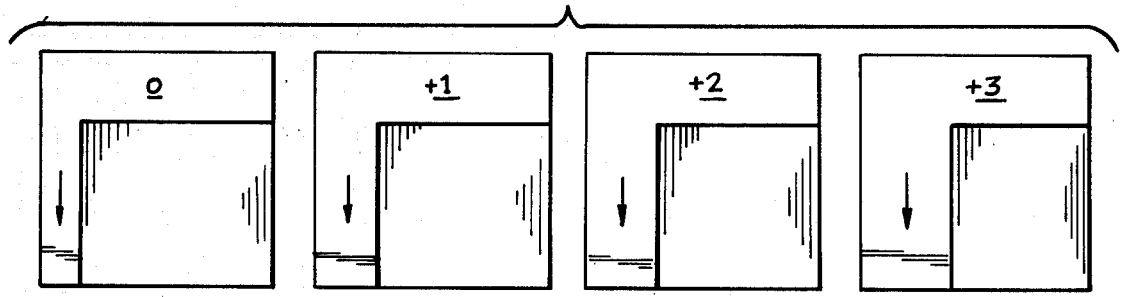
FIG. 3 shows front elevation views of various addition blocks, the rear elevation views being mirror images thereof.
Figure 4:
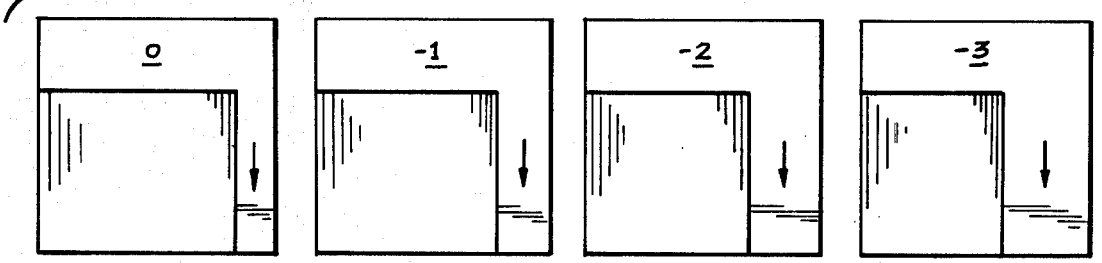
FIG. 4 shows front elevation views of various subtraction blocks, the rear elevation views being mirror images thereof.

A leaf spring 45 is secured to a retaining pin 60 mounted to the bottom portion of the wall of the base member 15 adjacent the positive answer block recess, as best shown in FIG. 2, and extends downward into the slot 24 to engage the teeth 25 of the summing rack 23, thus providing a detent action which (i) prevents accidental or undesired sliding movement of the summing rack 23 and (ii) provides a ratchet noise which advises individuals using the system that the summing rack 23 is in motion.

The sector cam 35 sequentially assumes four different positions in response to insertion of a positive or negative arithmetic value block in a corresponding one of the three central recesses of base member 15. These four positions are best explained with reference to FIGS. 2, 5, 6 and 11a through 11d.

Figure 5:
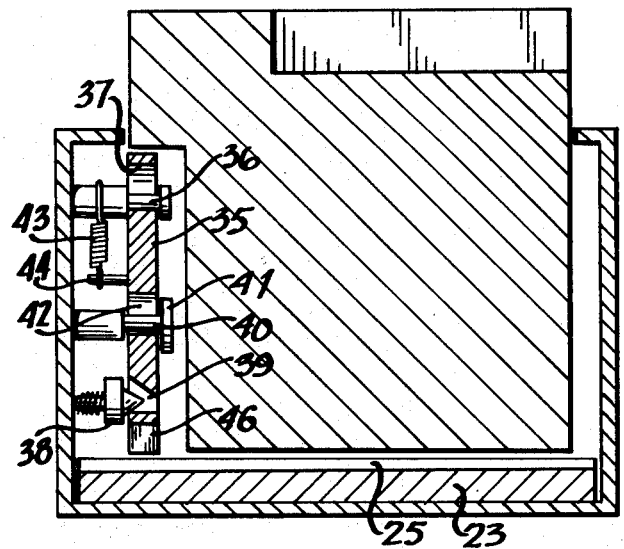
FIG. 5 is a side elevation cross sectional view of the arrangement shown in FIG. 1, taken along the cutting plane 5—5 therein.

The initial position of the sector gear or cam 35 i.e., when no arithmetic value block has been inserted in the corresponding recess, is as shown in FIGS. 5 and 11a, and in solid lines in the center recess of FIG. 2. In this position the sector gear 35 has its teeth 46 completely out of engagement with the teeth 25 of the gear rack 23. The pin 36 engages the bottom of the slot 37, and the pin 40 is disposed in the plane of vertical symmetry of the gear 35 and in contact with the bottom edge of the arcuate slot 42. The detent action of the alignment pin 38 in the alignment hole 39 resists rotational movement of the sector gear 35 about the pin 36.

When an arithmetic value block 20 is inserted an initial distance a into the center recess of the base member 15, as shown in FIG. 2, the sector gear 35 is caused to translate vertically downward until the pin 36 engages the top of the slot 37 and the pin 40 engages the top of the arcuate slot 42. During this time rotational motion of the cam 35 continues to be resisted by the detent action of the alignment pin 38 and the alignment hole 39 of the sector gear 35. This downward translational movement causes the teeth 46 of the sector gear 35 to engage or mesh with the teeth 25 of the summing rack 23, as shown in dashed lines in the center recess of FIG. 2.

Figure 11B:
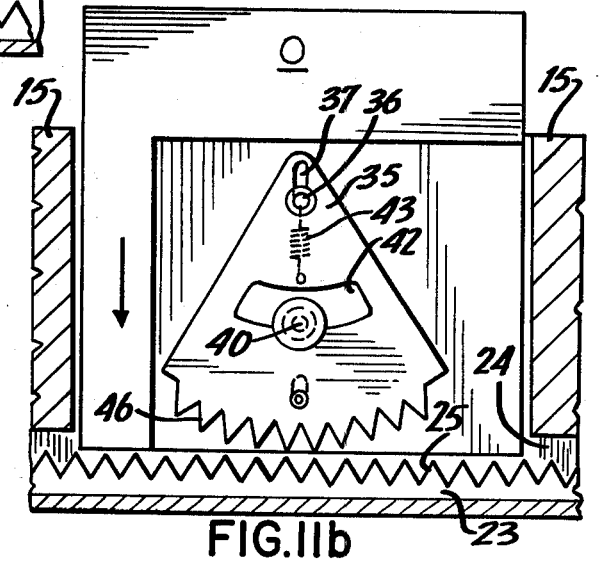
Figure 11C:
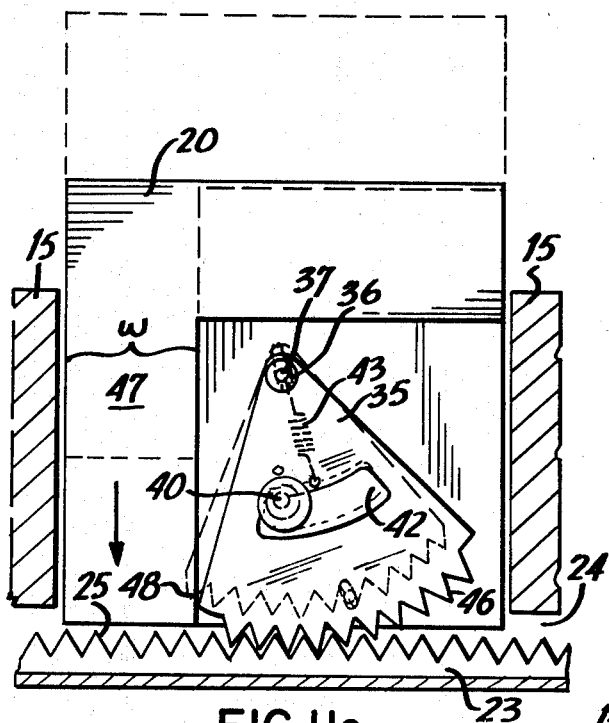

Further downward movement of the block 20, as best shown in FIG. 11c, causes the sector gear 35 to rotate to the right about pin 36, so that the meshing of the sector gear teeth 46 with the summing rack teeth 25 causes the summing rack 23 to move a linearly proportionate distance to the right. This position, which is only a momentary one, is shown in solid lines in FIG. 11c.

As soon as the sector gear 35 is rotated to the position shown in solid lines in FIG. 11c, the spring 43 acts to urge the sector gear 35 upward, i.e., out of engagement with the teeth 25 of the summing rack 23, and rotationally urges the sector gear 35 toward the initial or "rest" position thereof. However, rotational movement of the sector gear 35 toward its initial position, i.e., the the left, is prevented by the presence of the actuating portion 47 of the block 20. Therefore, the sector gear 35 merely slides vertically upward, with the corner 48 thereof in abutment with the adjacent vertical surface of the actuating portion 47 of the arithmetic value block 20, until the sector gear 35 assumes the position shown in dashed lines in FIG. 11c. In this position, the pin 36 engages the bottom of the slot 37, and the pin 40 engages the bottom of the arcuate slot 42.

When the arithmetic value block 20 is removed from the corresponding recess of the base member 15, the spring 43 causes the sector gear 35 to rotate to the left, to assume the initial position thereof, whereupon the alignment pin 38 once again engages the alignment hole 39.

Figure 6:
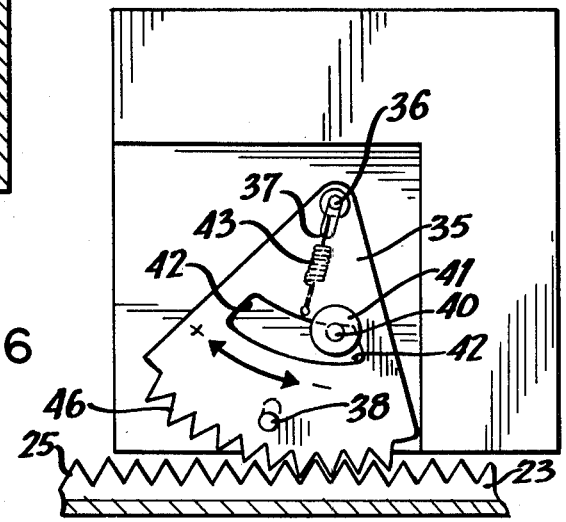
FIG. 6 is a cut-away view of a portion of the arrangement shown in FIG. 1, showing the interaction between an arithmetic value block, sector cam and summing gear rack therein.
Figure 11D:
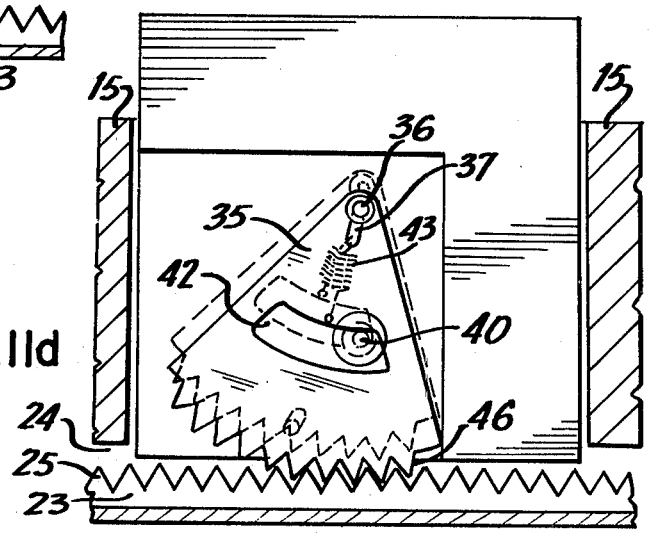

A similar sequence of positions is assumed by the sector gear 35 when a negative arithmetic value block is inserted into the corresponding recess, as best shown in FIGS. 11d, 6, and the left center recess of FIG. 2.

When a zero arithmetic value block is inserted, as best seen in FIG. 11b, the sector gear 35 is not engaged and therefore does not move at all.

The linear distance which the summing rack 23 is caused to move by the positive arithmetic value block 20 is proportional to the width w of the actuating portion 47 thereof. Similarly, the width of the actuating portion of each negative arithmetic value block determines the proportionate linear movement of the summing rack in response to insertion of said block into the corresponding recess of the base member 15.

As seen in the drawings and particularly in FIGS. 11c and 11d, the insertion of a positive arithmetic value block causes movement of the summing rack 23 to the right, while insertion of a negative arithmetic value block causes movement of said rack to the left. Thus, when arithmetic value blocks are inserted in one or more of the three central recesses of the base member 15, the direction of movement of the summing rack 23 corresponds to the sign of the algebraic sum of the corresponding arithmetic values, while the amplitude of movement of said summing rack is linearly proportional to the absolute value of said algebraic sum.

Figure 7A:
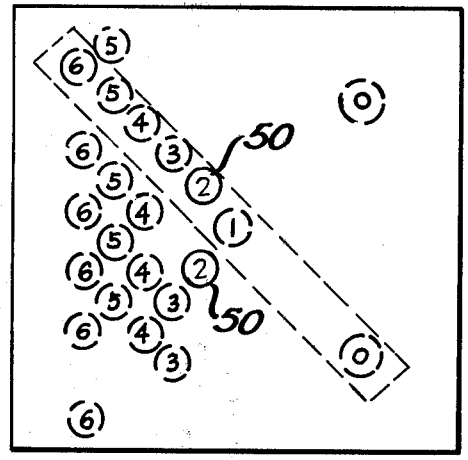
FIG. 7a is a top plan view of a positive answer block showing the positioning of index element engaging pegs thereon.

When the aforementioned algebraic sum is a positive number, the alignment of the index element holes 27 with respect to the bottom of the positive answer block recess is such that the holes 27 form a correspondingly unique pattern so that only an answer block having index element engaging pegs in uniquely corresponding positions can be fully inserted into said positive answer block receiving hole. That is, when arithmetic value blocks 16 to 18 are inserted as shown in FIG. 1, the algebraic sum thereof is +2, so that only a +2 value answer block 22 can be fully inserted into the corresponding positive answer block receiving recess of the base member 15. As best shown in FIG. 7a, the answer block 22 having a value of +2, has two tapered frusto-conical pegs 50 which engage corresponding recesses 51 (FIG. 10) of the summing rack 23.

Although two index element engaging pegs are shown in FIG. 7a, a series of answer blocks can be provided in which each has only a single peg, wherein the pegs are aligned along a diagonal as indicated by the dashed lines shown in FIG. 7a. Preferably, however, for educational and other purposes, it is recommended that each answer block have a number of index element engaging pegs equal to the arithmetic value of the corresponding block. That is, the answer block having a value of +3 (or −3) should have three pegs, the block having a value of +5 (or −5) should have five pegs, etc. All pegs of a particular answer block should be vertically aligned as shown in FIG. 7a.

Figure 7B:
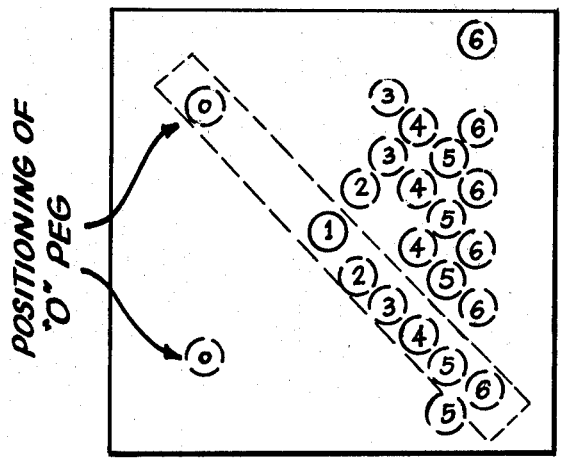
FIG. 7b is a top plan view of a negative answer block showing the positioning of index element engaging pegs thereon.
Figure 7C:
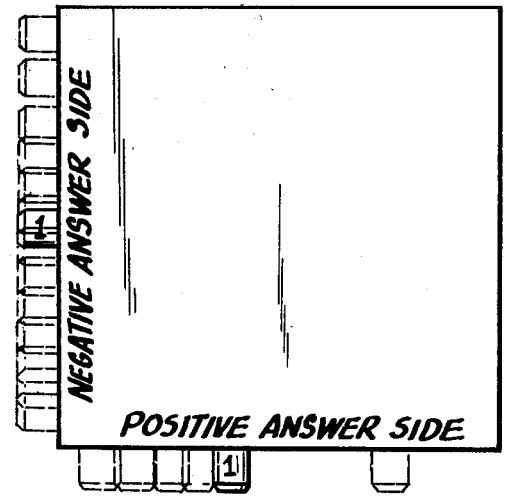
FIG. 7c is a side elevation view of a composite positive/negative answer block showing the relative positioning of positive and negative value index element engaging pegs thereon.

Similarly, if the algebraic sum of the values corresponding to the three blocks 16, 17 and 18 is negative, a negative value answer block having an index element engaging peg orientation uniquely corresponding to the resulting position of the index element holes 28, can be fully inserted into the negative answer block receiving recess 29. The corresponding negative answer block index element engaging peg positions are shown in FIG. 7b, wherein the same alignment principles apply as were previously discussed with reference to FIG. 7a.

If desired, one surface of an answer block can provide a peg arrangement corresponding to a given positive value, while another surface can have a peg arrangement corresponding to a negative answer value. Alternatively, different sides of the same answer block can correspond to two different positive, or two different negative answer values.

Where an answer block having more than one "active" or peg-bearing surface is employed, the sides of the answer block receiving recesses are relieved as shown in FIGS. 1 and 8, to avoid interference with the currently "inactive" index element engaging pegs.

If desired, arithmetic value blocks may also be provided with more than one "active" or actuating portion-bearing surface. Such a block is illustrated in FIG. 9, which shows an arithmetic value block having three active surfaces corresponding to the numerical values −1, −2, and +3.

Alternatively, a more elongated version of the system shown in FIG. 1 may be employed, utilizing elongated rectangular blocks or "cards" as shown in FIG. 12.

While rectangular arithmetic value blocks have been described, blocks having other polygonal shapes or even generally cylindrical shapes can alternatively be employed, so long as the base member has corresponding recesses and the blocks have actuating portions as previously described.

Although the summing rack 23 has been described with reference to index element holes therein, and corresponding index element engaging pegs on the answer blocks, the holes and pegs could be reversed, provided that the height of the slot 24 is correspondingly increased to allow movement of the summing rack 23 without interference between pegs thereon and adjacent portions of the base member 15.

We claim:

1. A system for utilizing interactive blocks to teach arithmetic, comprising:
    a base member having a longitudinal passage therein and a plurality of recesses communicating with said passage, each recess extending to a surface of said base member,
    a summary rack mounted for longitudinal movement in said passage;
    cam means disposed in selected ones of said recesses for causing incremental movement of said summing rack in response to insertion of an arithmetic value block into the corresponding recess, the amplitude of said movement being proportional to a given dimension of an actuating portion of said block associated with the arithmetic value thereof;
    indexing means operatively associated with said summing rack and having a series of index elements adjacent a predetermined one of said recesses, said index elements establishing a pattern in said recess uniquely corresponding to the longitudinal position of said summing rack in said passage, for enabling said predetermined recess to receive only an answer block having index element engaging means disposed in a pattern corresponding to an arithmetic value defining the longitudinal position of said summing rack;
    whereby when one or more arithmetic value blocks are inserted in the corresponding recesses, said predetermined recess is rendered capable of receiving only an answer block having an associated arithmetic value equal to the arithmetic combination of the values associated with said arithmetic value blocks.

2. The system according to claim 1, wherein the arithmetic value established by said indexing means is linearly proportional to the amplitude of movement of said summing rack, so that said predetermined recess is enabled to receive only an answer block having an associated arithmetic value equal to the sum of the arithmetic values associated with the arithmetic value blocks inserted in the corresponding recesses of said base.

3. The system according to claim 2, wherein said summing rack moves in one direction in response to insertion of an arithmetic value block having an actuating portion orientation corresponding to a positive value, and in the opposite direction in response to insertion of an arithmetic value block having an actuating portion orientation corresponding to a negative value.

4. The system according to claim 1, wherein the arithmetic value established by said indexing means is logarithmically proportional to the amplitude of movement of said summing rack, so that said predetermined recess is enabled to receive only an answer block having an associated arithmetic value equal to the product of the arithmetic values associated with the arithmetic value blocks inserted in the corresponding recesses of said base.

5. A system for utilizing interactive blocks to teach addition and subtraction, comprising:

a base member having a longitudinal passage therein and a plurality of recesses communicating with said passage, each recess extending to a common surface of said base member;

cam means engaging said summing rack and disposed in selected ones of said recesses for causing incremental movement of said summing rack in response to insertion of an arithmetic value block into the corresponding recess, the amplitude of said movement being proportional to a given dimension of an actuating portion of said block associated with the arithmetic value thereof, and the direction of said movement being determined by the longitudinal orientation of said actuating portion with respect to said base member;

indexing means operatively associated with said summing rack and having a series of index elements adjacent at least a predetermined one of said recesses, said index elements establishing a pattern in said recess uniquely and linearly corresponding to the longitudinal position of said summing rack in said passage, for enabling said predetermined recess to receive only an answer block having index element engaging means disposed in a pattern corresponding to an arithmetic value defining the longitudinal position of said summing rack;

whereby when one or more arithmetic value blocks are inserted in the corresponding recesses, said predetermined recess is rendered capable of receiving only an answer block having an associated arithmetic value equal to the algebraic sum of the values associated with said arithmetic value blocks.

6. The system according to claim 5, wherein there are two of said predetermined recesses, said summing rack having (i) a first series of index elements adjacent said one predetermined recess for enabling said one predetermined recess to receive only answer blocks including index element engaging means having positive values associated therewith, and (ii) a second series of index elements adjacent the other predetermined recess to receive only answer blocks including index element engaging means having negative values associated therewith.

7. The system according to claim 1, 2, 3, 4, 5 or 6, wherein said summing rack has a multiplicity of transverse gear teeth, and each of said cam means includes a sector gear having teeth adapted to engage the teeth of said summing rack.

8. The system according to claim 7, wherein said cam means includes means for causing said sector gear to sequentially (i) translate into engagement with said summing rack upon insertion of an arithmetic value block an initial distance into the corresponding recess, (ii) rotate in one direction while in engagement with said summing rack u on insertion of said arithmetic value block a further distance into said corresponding recess, (iii) translate out of engagement with said summing rack immediately after said rotation in one direction, and (iv) rotate in the opposte direction to the initial position thereof upon removal of said arithmetic value block a given distance out of said recess.

9. The system according to claim 1, 2, 3, 4, 5 or 6, wherein said index elements are holes and each of said index element engaging means is a peg.

10. The system according to claim 9, wherein said pegs are tapered.

11. The system according to claim 1, 2, 3, 4, 5 or 6, further comprising means on said summing rack and an adjacent portion of said base member for indicating the arithmetic value defining the longitudinal position of said summing rack.

12. The system according to claim 1, 2, 3, 4, 5 or 6, further comprising detent means for preventing accidental longitudinal movement of said summing rack.

13. The system according to claim 1, 2, 3, 4, 5 or 6, futher comprising a plurality of arithmetic value blocks, each block having approximately a rectangular prismatic shape, each such block having an actuating portion thereof comprising an elongated raised region.

14. The system according to claim 13, wherein said arithmetic value blocks are approximately in the form of elongated rectangular prisms, and said corresponding recesses have similar elongated rectangular shapes.

15. The system according to claim 6, further comprising a plurality of answer blocks, at least one of said answer blocks having (i) index element engaging means on a first surface thereof for engaging at least one of said first series of index elements, and (ii) index element engaging means on a second surface thereof for engaging at least one of said second series of index elements.

* * * * *